(12) United States Patent
Erera et al.

(10) Patent No.: US 10,831,770 B2
(45) Date of Patent: Nov. 10, 2020

(54) SYSTEM AND METHOD FOR ESTIMATING QUERY PERFORMANCE IN DOCUMENT RETRIEVAL

(71) Applicant: International Business Machines Corporation, Armonk, NY (US)

(72) Inventors: Shai Erera, Gilon (IL); Haggai Roitman, Yoknea'm Elit (IL); Oren Sar-Shalom, Nes Ziona (IL); Bar Weiner, Hof Ashqelon (IL)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 15/838,397

(22) Filed: Dec. 12, 2017

(65) Prior Publication Data

US 2019/0179914 A1 Jun. 13, 2019

(51) Int. Cl.
*G06F 16/2457* (2019.01)
*G06F 16/93* (2019.01)
*G06F 16/33* (2019.01)
*G06F 16/951* (2019.01)
*G06F 16/332* (2019.01)
(Continued)

(52) U.S. Cl.
CPC .... *G06F 16/24578* (2019.01); *G06F 16/3334* (2019.01); *G06F 16/3346* (2019.01); *G06F 16/93* (2019.01); *G06F 16/248* (2019.01); *G06F 16/3322* (2019.01); *G06F 16/951* (2019.01); *G06F 16/9535* (2019.01)

(58) Field of Classification Search
CPC .. G06F 16/951; G06F 16/24578; G06F 16/93; G06F 16/9535; G06F 16/3334; G06F 16/248; G06F 16/3322; G06F 16/90324

USPC ........ 707/728, 723, 759, 708, 722, 752, 754
See application file for complete search history.

(56) References Cited

U.S. PATENT DOCUMENTS

| | | | |
|---|---|---|---|
| 8,275,762 B2 | 9/2012 | Gupta et al. | |
| 8,423,541 B1 * | 4/2013 | Baluja | G06F 16/9535 707/732 |

(Continued)

OTHER PUBLICATIONS

Roitman, "An Enhanced Approach to )ery Performance Prediction Using Reference Lists", Proceedings of the 40th International ACM SIGIR Conference on Research and Development in Information Retrieval, 2017, pp. 869-872.

(Continued)

*Primary Examiner* — Dangelino N Gortayo
(74) *Attorney, Agent, or Firm* — Roy S. Melzer

(57) ABSTRACT

A computer implemented method for estimating quality of document retrieval comprising: retrieving from a corpus of documents stored on at least one storage a plurality of digital documents which comply with a document retrieval query according to a retrieval model; computing a plurality of retrieval scores each calculated for one of the plurality of digital documents using a relevance function scoring a relevance of one of the retrieved plurality of digital documents to the query; computing a calibrated weighted product model (WPM) estimator by calculating a combination of the plurality of retrieval scores weighted according to a plurality of retrieval features of the corpus and/or the query and/or a document, wherein the plurality of retrieval features are weighted according to a relative importance; and using the calibrated WPM estimator to score the plurality of digital documents' relevance to the query.

14 Claims, 5 Drawing Sheets

(51) Int. Cl.
*G06F 16/248* (2019.01)
*G06F 16/9535* (2019.01)

(56) References Cited

U.S. PATENT DOCUMENTS

| | | | | |
|---|---|---|---|---|
| 8,515,975 | B1* | 8/2013 | Federici | G06F 16/335 |
| | | | | 707/751 |
| 9,002,867 | B1* | 4/2015 | Adams | G06F 16/3334 |
| | | | | 707/759 |
| 9,189,523 | B2 | 11/2015 | Ganapathi et al. | |
| 2004/0215606 | A1* | 10/2004 | Cossock | G06F 16/337 |
| 2015/0317320 | A1* | 11/2015 | Miller | G06F 16/248 |
| | | | | 707/728 |
| 2016/0098403 | A1* | 4/2016 | Lee | G06F 16/93 |
| | | | | 707/749 |
| 2017/0075893 | A1 | 3/2017 | Hummel et al. | |
| 2017/0083568 | A1 | 3/2017 | Rabinovich et al. | |
| 2018/0095957 | A1* | 4/2018 | Mishne | G06F 16/93 |

OTHER PUBLICATIONS

Khwileh et al., "Improving the Reliability of Query Expansion for User-Generated Speech Retrieval Using Query Performance Prediction", Experimental IR Meets Multilinguality, Multimodality, and Interaction, 2017, pp. 43-56.

Akdere et al., "Learning-based Query Performance Modeling and Prediction", Department of Computer Science Brown University, 2011.

Kurland et al., "Query-Performance Prediction and Cluster Ranking: Two Sides of the Same Coin", Proceedings of the 21st ACM international conference on Information and knowledge management, 2012, pp. 2459-2462.

* cited by examiner

200

---

201
Retrieve a plurality of digital documents

203
Compute a plurality of retrieval scores

205
Compute a calibrated WPM estimator

209
Use the calibrated WPM estimator

301
Calibrate the plurality of retrieval scores

305
Sum the plurality of calibrated retrieval scores

308
Divide the sum score by the number of digital documents

FIG. 3

SYSTEM AND METHOD FOR ESTIMATING QUERY PERFORMANCE IN DOCUMENT RETRIEVAL

BACKGROUND

The present invention, in some embodiments thereof, relates to an estimation of query performance prediction and, more specifically, but not exclusively, to an estimation of query performance prediction in a system for retrieving documents.

One definition of information retrieval is an activity of obtaining information resources relevant to an information need from a collection of information resources. Examples of information resources are a document, information in a document, metadata that describe data, and a database of texts and/or images and/or sounds. A query is a request for information from a collection of information resources. In some information systems the information need is expressed as a query using a query definition language or notation. In some query definition languages a query comprises a plurality of query terms, for example an identified word value. A typical query based information retrieval application or system searches a collection of information resources according to a predefined retrieval model and shows a user some of the information resources that match the information need expressed in the query. A web search engine is an example of an information retrieval application.

It is common practice in current information retrieval systems, when a user (either human or a computerized device accessing the information resources) submits a query to the information retrieval system, the system computes a numeric retrieval score representing how well each information resource matches the query according to an identified scoring test, and typically presents to the user a predefined amount of top ranking resources according to the computed retrieval score. A scoring function is a method used to compute a retrieval score.

As used herein, query performance refers to a measure of search effectiveness, i.e. how well a retrieval system is effective in obtaining, from a collection of information resources, information resources relevant to a query, i.e. information resources that satisfy the information need expressed by the query.

There may be a need, for example when designing an information retrieval system or when comparing performance of more than one existing information retrieval system, to evaluate effectiveness of a system or a retrieval model used by a system, that is to evaluate a system's query performance. Query performance of every possible query typically cannot be predicted accurately, thus it is common practice to compute an estimator for query performance prediction for evaluating a retrieval system's effectiveness in obtaining information resources relevant to a query from an identified collection of information resources. Some methods for estimating query performance prediction compute an estimator for query performance prediction after a first retrieval is performed. This is known as post-retrieval prediction. Almost all modern evaluation metrics for predicting how well a system meets information needs of users of the system are designed to take into account a relative order of retrieved information resources' scores and give more weight to information resources retrieved at higher ranks (that is, having a higher retrieval score than one or more scores of other information resources). Some methods for computing such metrics use a predefined amount of top-ranking retrieved information resources when computing an estimator for query performance prediction.

SUMMARY

It is an object of the present invention to provide a system and a method for estimating query performance prediction and, more specifically, but not exclusively, to estimating query performance prediction in a system for retrieving documents.

The foregoing and other objects are achieved by the features of the independent claims. Further implementation forms are apparent from the dependent claims, the description and the figures.

According to a first aspect of the invention, a computer implemented method for estimating quality of document retrieval comprises: retrieving from a corpus of documents stored on at least one storage a plurality of digital documents which comply with a document retrieval query according to a retrieval model; computing a plurality of retrieval scores each calculated for one of the plurality of digital documents using a relevance function scoring a relevance of one of the retrieved plurality of digital documents to the query; computing a calibrated weighted product model (WPM) estimator by calculating a combination of the plurality of retrieval scores weighted according to a plurality of retrieval features of the corpus and/or the query and/or a document, wherein the plurality of retrieval features are weighted according to a relative importance; and using the calibrated WPM estimator to score the plurality of digital documents' relevance to the query.

According to a second aspect of the invention, a system for estimating quality of document retrieval comprises: at least one storage; and at least one hardware processor, adapted to: retrieve from a corpus of documents stored on the at least one storage a plurality of digital documents which comply with the document retrieval query according to a retrieval model; compute a plurality of retrieval scores each calculated for one of the retrieved plurality of digital documents using a relevance function scoring a relevance of one of the plurality of digital documents to the query; compute a calibrated weighted product model (WPM) estimator by calculating a combination of the plurality of retrieval scores weighted according to a plurality of retrieval features of the corpus and/or the query and/or a document, wherein the plurality of retrieval features are weighted according to a relative importance; and use the calibrated WPM estimator to score the plurality of digital documents' relevance to the query.

With reference to the first and second aspects of the invention, in a first possible implementation of the first and second aspects calculating the combination of the plurality of retrieval scores weighted according to the plurality of retrieval features comprises: calibrating the plurality of retrieval scores, by calibrating the retrieval score of each of the plurality of digital documents by: producing a document score calibrator by: computing a plurality of retrieval feature values by computing a retrieval feature value for each of the plurality of retrieval features; producing a plurality of weighted feature values, by computing each of the document's plurality of retrieval feature values to the power of the weight of retrieval feature value's retrieval feature; and computing a product of the plurality of weighted feature values to produce the document score calibrator; and multiplying the document's retrieval score by the document's document score calibrator; summing the plurality of calibrated retrieval scores to produce a sum score; and dividing the sum score by the number of digital documents in the plurality of digital documents to produce the calibrated WPM estimator. Optionally, each of the plurality of documents has a plurality of document terms, at least one of the plurality of retrieval feature values is computed using at least one of the plurality of document terms, a first of the plurality of retrieval features has a first certain weight value, and a second of the plurality of retrieval features has a second certain weight value. Computing the WPM estimator using at least one retrieval feature value computed using at least one document term may facilitate expressing some retrieval effectiveness criteria dependent on at least one characteristic of a document. Optionally, the query has a plurality of query terms, at least one of the plurality of retrieval feature values is computed using at least one of the plurality of query terms, a first of the plurality of retrieval features has the first certain weight value, and a second of the plurality of retrieval features has the second certain weight value. Computing the WPM estimator using at least one retrieval feature value computed using at least one query term may facilitate expressing some retrieval effectiveness criteria dependent on at least one characteristic of the query. Optionally, at least one of the plurality of retrieval feature values is computed using a result of computing the corpus' score using the relevance function, a first of the plurality of retrieval features has the first certain weight value, and a second of the plurality of retrieval features has the second certain weight value. Computing the WPM estimator using at least one retrieval feature value computed using a result of computing the corpus' score may facilitate expressing some retrieval effectiveness criteria dependent on at least one characteristic of the corpus. Optionally, at least one of the plurality of retrieval feature values is computed using a document retrieval score, a first of the plurality of retrieval features has the first certain weight value, and a second of the plurality of retrieval features has the second certain weight value. Computing the WPM estimator using at least one retrieval feature value computed using a document retrieval score may facilitate expressing some retrieval effectiveness criteria dependent on at least one characteristic of a document. Optionally, the first certain weight value is different from the second certain weight value. Using different weights for different retrieval features may facilitate expressing a complex information need combining multiple retrieval effectiveness criteria having different relative importance.

With reference to the first and second aspects of the invention, or the first possible implementation of the first and second aspects, in a second possible implementation of the first and second aspects the document has a plurality of document terms. A first feature value of the plurality of retrieval feature values, having a first certain weight value of the first feature value's retrieval feature's weight, is computed by: computing a plurality of document term occurrence counts by computing for each of the plurality of document terms an amount of occurrences of the document term in the document; computing a document's length by summing the plurality of document term occurrence counts; and computing an inverse of the document's length. A second feature value of the plurality of retrieval feature values, having a second certain weight value of the second feature value's retrieval feature's weight, is computed by: computing a first probability of the document being generated from a relevance model induced from the plurality of digital documents using methods as known in the art; computing a second probability of the document being generated from a background model induced from the corpus using methods as known in the art; computing a ratio by dividing the first probability by the second probability; and computing a logarithm of the ratio. The first certain weight value is different from the second certain weight value. Such an implementation may reflect an amount of document terms in a document and a log-likelihood that a document is generated from a relevance model induced from the plurality of digital documents, using methods as known in the art in estimating query performance prediction, with different relative importance.

With reference to the first and second aspects of the invention, or the first possible implementation of the first and second aspects, in a third possible implementation of the first and second aspects the query has a plurality of terms. A first feature value of the plurality of retrieval feature values, having a first certain weight value of the first feature value's retrieval feature's weight, is computed by: computing a plurality of query term occurrence counts by computing for each of the plurality of query terms an amount of occurrences of the query term in the query; computing a query length by summing the plurality of query term occurrence counts; computing a square root of the query length; and computing an inverse of the square root of the query length. A second feature value of the plurality of retrieval feature values, having a second certain weight value of the second feature value's retrieval feature's weight, is computed by: computing the corpus' score using the relevance function; dividing the corpus' score by the document's retrieval score to produce a score ratio; and subtracting the score ratio from one. The first certain weight value is different from the second certain weight value. Such an implementation may reflect an amount of query terms in the query and a statistical measure measuring a document's association strength with the corpus in estimating query performance prediction, with different relative importance.

With reference to the first and second aspects of the invention, or the first possible implementation of the first and second aspects, in a fourth possible implementation of the first and second aspects a first feature value of the plurality of retrieval feature values, having a first certain weight value of the first feature value's retrieval feature's weight, is computed by: computing the corpus' score using the relevance function; and computing an inverse of the corpus' score. A second feature value of the plurality of retrieval feature values, having a second certain weight value of the second feature value's retrieval feature's weight, is computed by: computing a mean retrieval score of the plurality of retrieval scores; dividing the document's retrieval score by the mean retrieval score to produce a score ratio; computing a natural logarithm of the score ratio; and computing an absolute value of the computed natural logarithm. The first certain weight value is different from the second certain weight value. Such an implementation may reflect a statistical measure measuring the corpus's similarity to the query and the document's retrieval score in estimating query performance prediction, with different relative importance.

With reference to the first and second aspects of the invention, or the first possible implementation of the first and second aspects, in a fifth possible implementation of the first and second aspects the document has a plurality of document terms and the query has a plurality of query terms. A first feature value of the plurality of retrieval feature values is computed by: computing a plurality of document term occurrence counts by computing for each of the plurality of document terms an amount of occurrences of the document term in the document; computing a document's length by summing the plurality of document term occurrence counts; and computing an inverse of the document's length. A second feature value of the plurality of retrieval feature values is computed by: computing a first probability of the document being generated from a relevance model induced from the plurality of digital documents; computing a second probability of the document being generated from a background model induced from the corpus; computing a ratio by dividing the first probability by the second probability; and computing a logarithm of the ratio. A third retrieval value of the plurality of retrieval feature values is computed by: computing a plurality of query term occurrence counts by computing for each of the plurality of query terms an amount of occurrences of the query term in the query; computing a query length by summing the plurality of query term occurrence counts; computing a square root of the query length; and computing an inverse of the square root of the query length. A fourth retrieval value of the plurality of retrieval feature values is computed by: computing the corpus' score using the relevance function; dividing the corpus' score by the document's retrieval score to produce a score ratio; and subtracting the score ratio from one. A fifth retrieval value of the plurality of retrieval feature values is computed by: computing the corpus' score using the relevance function; and computing an inverse of the corpus' score; and wherein a sixth retrieval value of the plurality of retrieval feature values is computed by: computing a mean retrieval score of the plurality of retrieval scores; dividing the document's retrieval score by the mean retrieval score to produce a score ratio; computing a natural logarithm of the score ratio; and computing an absolute value of the computed natural logarithm. Optionally, a seventh feature value of the plurality of retrieval feature values is computed by: computing a first plurality of term products by computing for each of the plurality of document terms a first term product by: computing a probability of the document term to be in the document to produce a document term probability; computing a logarithm of the document term probability; and multiplying the document term probability by the logarithm of the document term probability; and computing a first sum of the first plurality of term products. Optionally, an eighth feature value of the plurality of retrieval feature values is computed by: computing a second plurality of term products by computing for each of the plurality of document terms a second term product by: computing a probability of the document term to be in the corpus to produce a corpus term probability; dividing the document term probability by the corpus term probability to produce a first ratio; computing a logarithm of the first ratio; and multiplying the document probability term by the logarithm of the first ratio; and computing a second sum of the second plurality of term products. Optionally, a ninth retrieval value of the plurality of retrieval feature values is computed by computing an Okapi-BM25 score of the document given the query, according to methods as known in the art. Optionally, a tenth retrieval value of the plurality of retrieval feature values is computed by: computing a plurality of term inverse-document-frequency (idf) values by computing for each of the plurality of documents terms a term idf value using methods as known in the art; computing a sum idf value by summing the plurality of term idf values; computing a plurality of third term products by computing for each of the plurality of document terms a third term product by: computing a normalized inverse-document-frequency (nidf) value by dividing the document term's term idf value by the sum idf value; dividing the document term probability by nifd value to produce a second ratio; computing a logarithm of the second ratio; and multiplying the document term probability by the logarithm of the second ration; computing a third sum of the third plurality of term products; multiplying the third sum by −1 to produce an exponent value; and computing the natural exponential function of the exponent value.

With reference to the first and second aspects of the invention, in a sixth possible implementation of the first and second aspects the system further comprises using the calibrated WPM estimator to generate a response to the query. Using the calibrated WPM estimator to generate a response to the query may facilitate increasing accuracy of the generated response.

With reference to the first and second aspects of the invention, or the sixth implementation of the first and second aspects, in a seventh possible implementation of the first and second aspects the calibrated WPM estimator is used to generate a response to the query by: retrieving from the corpus of documents a second plurality of digital documents which comply with the document retrieval query according to a second retrieval model; computing a second plurality of retrieval scores each calculated for one of the second plurality of digital documents using the relevance function; computing a second calibrated weighted product model (WPM) estimator by calculating a second combination of the second plurality of retrieval scores weighted according to the plurality of retrieval features of the corpus and/or the query and/or a document; comparing the calibrated WPM estimator to the second calibrated WPM estimator; and generating a response to the query comprising either the plurality of digital documents or the second plurality of digital documents, selected according to a result of the comparison. Such an implementation may facilitate choosing an optimal retrieval model from two or more retrieval models.

With reference to the first and second aspects of the invention, or the sixth implementation of the first and second aspects, in an eighth possible implementation of the first and second aspects the calibrated WPM estimator is used to generate a response to the query by: retrieving from the corpus of documents a second plurality of digital documents which comply with a second document retrieval query according to the retrieval model; computing a second plurality of retrieval scores each calculated for one of the second plurality of digital documents using the relevance function; computing a second calibrated weighted product model (WPM) estimator by calculating a second combination of the second plurality of retrieval scores weighted according to the plurality of retrieval features of the corpus and/or the second query and/or a document; comparing the calibrated WPM estimator to the second calibrated WPM estimator; and generating a response to the query comprising either the plurality of digital documents or the second plurality of digital documents, selected according to a result of the comparison. Such an implementation may facilitate choosing an optimal query for use with a retrieval model, for example when an information need may be expressed in more than one possible query.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a flowchart schematically representing an optional flow of operations for estimating document retrieval, according to some embodiments of the present invention;

FIG. 3 is a flowchart schematically representing an optional flow of operations for computing a calibrated weighted product model estimator, according to some embodiments of the present invention;

DETAILED DESCRIPTION

Figure 1:
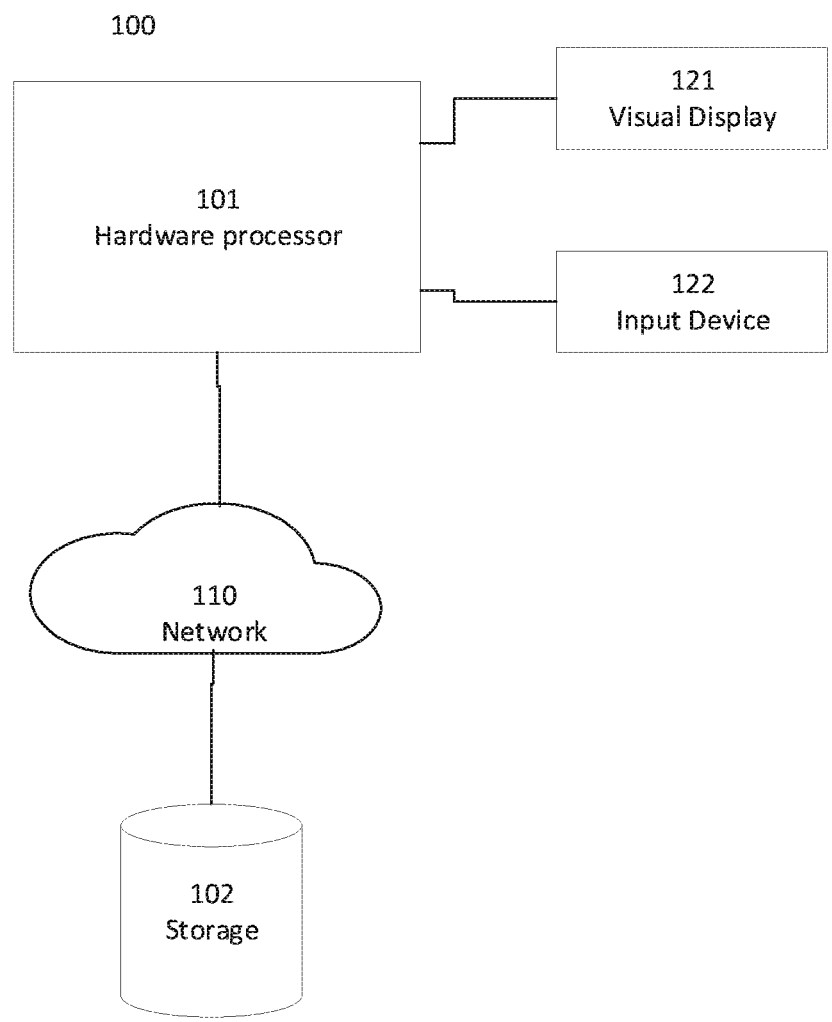
FIG. 1 is a schematic block diagram of an exemplary system, according to some embodiments of the present invention.

The present invention, in some embodiments thereof, relates to an estimation of query performance prediction and, more specifically, but not exclusively, to an estimation of query performance prediction in a system for retrieving documents.

The following description focuses on a system for retrieving documents, and in particular digital documents, stored on at least one storage, however the present invention may be applied to other systems for retrieving other types of information resources, where there is a scoring function for scoring an information resource's relevance to a query, and where there are one or more weighted retrieval effectiveness criteria, henceforth referred to as retrieval features.

Some existing methods for estimating query performance prediction use a mean retrieval score of a plurality of retrieval scores of a plurality of top ranking retrieved documents as an indicator of search effectiveness, i.e. query performance, for an identified query. The mean retrieval score captures a central tendency of a distribution of a plurality of retrieval scores. The higher the tendency is, the more it is assumed that observed retrieval scores represent actual search effectiveness. In other words, the higher the tendency is, the more confidence we assign to an ability of the retrieval system's retrieval model to retrieve documents relevant to the query.

Henceforth, we use q to denote a query. C denotes a collection of information resources, for example a corpus of documents. The term d denotes a document. Function s(d) denotes a retrieval score assigned by an identified retrieval model to document d, where d is an element of C such that $d \in C$. D denotes a subset of C, consisting of a plurality of documents $d \in C$ having highest scores s(d) (according to the identified retrieval method). An amount of documents in D is denoted by k. The term r denotes a relevance event in an identified context.

Estimating performance of a retrieval system may be expressed as estimating a likelihood of finding relevant information for query q in subset D, that is p(D|q,r). Some existing methods estimate p(D|q,r) by analyzing a plurality of retrieval scores s(d) for a plurality of documents $d \in D$. Specifically, some such methods estimate mean retrieval score E(s|D). According to "Back to the Roots: A probabilistic framework for query performance prediction" by Kurland et al., p(D|q,r) may be derived by:

$$p(D|q,r) \stackrel{\sim}{=} p(r|D)\Sigma_{d \in D} p(d|q,r)p(d|D,r) \qquad (1)$$

where:

p(r|D) denotes a probability that there exists relevant information in D, and may be estimated, for example by analyzing one or more properties of D that may indicate the existence of relevant information in D. Examples of such properties are a cohesion of D, measured for example by a list diameter of D, a clustering tendency of D and a diversity of D;

p(d|q,r) denotes a probability that document d provides a relevant answer to query q; and p(d|D,r) denotes a probability that d is generated by a relevant subset D, representing a strength of d's association with D, and may be estimated according to a likelihood of generating d from D's induced relevance model compared to a likelihood of generating d from a background model induced from C, using methods as known in the art. D's induced relevance model models a relevant part of information in D, denoted by (D,r). We note that $$p(d|q,r) \stackrel{def}{=} \frac{p(q|d,r)(p(r|d)p(d)}{p(r|q)p(q)}$$

and assume that p(q) has a uniform distribution. From this we obtain:

$$p(D|q,r) \propto \frac{p(r|D)}{p(r|q)} \sum_{d \in D} p(q|d,r)p(r,d)p(d)p(d|D,r)$$

where:

p(q|d,r) represents query likelihood of document d, commonly estimated according to observed score s(d) determined by the identified retrieval model. In some retrieval model implementations, such according to a similarity between query q and document d; and p(r|q) denotes a probability that query q is a relevant representation of an information need.

We assume that documents in D are uniformly distributed over D, i.e.

$$p(d) \stackrel{def}{=} \frac{1}{|D|}.$$

In addition, we note that $s(d) \triangleq p(q|d) \approx p(q|d,r)$. Combining with (1), we obtain a possible estimator for query performance prediction:

$$p(D|q,r) \stackrel{def}{=} \frac{1}{|D|} \sum_{d \in D} s(d) \left[ \frac{p(r|d)p(d|D,r)p(r|D)}{p(r|q)} \right] \quad (2)$$

We refer to the term $$\frac{p(r|d)p(d|D,r)p(r|D)}{p(r|q)}$$

in equation (2) as a document score calibrator, as in equation (2) each document's retrieval score is multiplied by this term when computing a linear combination of a plurality of document retrieval scores. The document score calibrator may be further developed using estimators for and alternative representations of $p(r|d)$, $p(d|D,r)$, $p(r|D)$ and $p(r|q)$.

A retrieval effectiveness criterion, referred to herein as a retrieval feature, is a characteristic of a query, a corpus, a retrieved plurality of documents, or a document that may contribute to effectiveness of document retrieval. Some non-limiting examples of such characteristics are a query length, a query term, a document length, a document term, and a corpus score computed using scoring function s. Examples of a document term are an identified word value in the document and an identified combination of word values in the document. A query may comprise a plurality of query terms, for example an identified word value.

Some of the aforementioned estimators and alternative representations may be expressed using one or more elements sensitive to one or more retrieval effectiveness criteria (i.e. retrieval features) of query q, for example a retrieval feature expressed using the query's length or the query's plurality of terms. Some other of the aforementioned estimators and alternative representations may be expressed using one or more elements sensitive to one or more retrieval features of corpus C, for example a retrieval feature expressed using a score computed for C. Yet some other of the aforementioned estimators and alternative representations may be expressed using one or more elements expressed using one or more retrieval features of a document, for example a document's length. Yet some other of the aforementioned estimators and alternative representations may be expressed using one or more elements expressed using one or more retrieval features of a retrieved plurality of documents, for example an amount of retrieved documents.

In practice, a retrieval model may be governed by one or more contradicting aspects that should be considered in parallel, for example relevance of a document and diversity of a subset of retrieved documents, and it may be that not all retrieval quality criteria can be fully satisfied simultaneously by one retrieval model.

We hereby propose, in some embodiments of the present invention, using a weighted combination of a plurality of retrieval features when computing an estimator for query performance prediction:

$$p(D|q,r) \stackrel{def}{=} \frac{1}{|D|} \sum_{d \in D} s(d) \Phi_r(d) \quad (3)$$

where $\Phi_r(d)$ is document d's document score calibrator (in equation (2)) computed using the weighted combination of the plurality of retrieval features.

A weighted combination may be used to express a tradeoff between one or more retrieval features, indicating greater importance of an identified retrieval feature by assigning a greater weight to the identified retrieval feature relative to a plurality of weights assigned to other retrieval features.

Weighted Product Model (WPM) is a known in the art approach to general multi-criteria decision analysis and may be used to combine different decision criteria. It is possible to view each of the plurality of retrieval features, denoted by F, as defining a single decision criterion. The present invention proposes, in some embodiments thereof, to assign each retrieval feature, denoted by $f_i$, of the plurality of retrieval features, a positive real weight $w_j$, reflecting relative importance of each of the plurality of retrieval features, and using a WPM approach to compute document score calibrator $\Phi_r(d)$ for each document $d \in D$. Weight $w_j$ is optionally greater or equal to zero.

In such embodiments, when computing the estimator for query performance prediction, a retrieval feature value, denoted by $f_j(d)$, is computed for each of a weighted plurality of retrieval features with reference to each of the retrieved documents in D retrieved from a corpus of documents C stored in at least one storage, and a resulting plurality of feature values is combined, using a WPM approach, with the plurality of weights of the plurality of retrieval features to produce the document's document score calibrator, as follows:

$$\Phi_{r,F}(d) \stackrel{def}{=} \Pi_{j=1}^{h} (f_j(d))^{w_j} \quad (4)$$

Where h denotes an amount of retrieval features $f_j$ in plurality of retrieval features F.

A linear combination of a plurality of document scores of a plurality of documents in D, each multiplied by the respective document's document score calibrator, is used in such embodiments as an estimator for query performance prediction (QPP estimator), by using in equation (3) the document score calibrator computed using equation (4), resulting in the following equation:

$$p(D|q,r) \stackrel{def}{=} \frac{1}{|D|} \sum_{d \in D} s(d) \Phi_{r,F}(d) \stackrel{def}{=} \frac{1}{|D|} \sum_{d \in D} s(d) \prod_{j=1}^{h} (f_j(d))^{w_j} \quad (5)$$

Using the present invention may facilitate defining a plurality of QPP estimators, tailored according to one or more identified effectiveness preferences.

In addition, in some embodiments of the present invention, one or more QPP estimators computed using the plurality of weighted retrieval features are used to generate a response to a query, by comparing at least two QPP estimators computed after retrieving at least two pluralities of documents. In some embodiments the at least two pluralities of documents are retrieved using one query and at least two retrieval models; in some other embodiments the at least two pluralities of documents are retrieved using one retrieval model and at least two queries. Next, one of the at least two pluralities of documents may be selected according to a result of the comparison. In such embodiments, the present invention may be used to provide a preferred response to a query and/or to identify a preferred retrieval method, using a QPP estimator tailored to reflect relative importance of a plurality of retrieval features with regards to an identified information need, allowing better accuracy of the response to the query and/or identification of the preferred retrieval method according to the identified information need.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Henceforth, the term "network" refers to a digital communication network.

Reference is now made to FIG. 1, showing a schematic block diagram of an exemplary system 100, according to some embodiments of the present invention. In such embodiments, at least one hardware processor 101 is connected to at least one storage 102, storing a corpus of documents. Optionally, at least one storage 102 is electrically connected to at least one hardware processor 101. Optionally, at least one storage 102 is connected to at least one hardware processor 101 via a network 110. Network 110 may be a local area network (LAN), for example an Ethernet LAN. Optionally, network 110 is a wide area network (WAN). The WAN may be a private WAN. The WAN may be a public WAN, for example the Internet. Optionally, at least one hardware processor 101 is connected to at least one input device 122, for example a keyboard, for the purpose of receiving one or more queries. In some embodiments, at least one hardware processor 101 receives the one or more queries via a network interface, for example a network interface connected to network 110, from another hardware processor executing software adapted to generate a query or to relay a query received from a user. Optionally, at least one hardware processor 101 is connected to at least one visual display 121, for the purpose of displaying to a user a score of a plurality of documents retrieved in response to a query, or a response to a query. Examples of a visual display are a computer monitor and a cell phone screen.

To estimate quality of document retrieval, in some embodiments of the present invention system 100 implements the following optional method.

Reference is now made to FIG. 2, showing a flowchart schematically representing an optional flow of operations 200 for estimating document retrieval, according to some embodiments of the present invention. In such embodiments, at least one hardware processor 101 retrieves in 201 a plurality of documents, denoted by D, from a corpus of documents, denoted by C, stored on at least one storage 102, such that the plurality of documents comply with a document retrieval query, according to a retrieval model. The document retrieval query, henceforth referred to as the query and denoted by q, may comprise a plurality of query terms, for example an identified word value. Optionally, at least one hardware processor 101 receives query q from a user via at least one input device 122. Optionally, at least one hardware processor 101 receives query q from another hardware processor via a network interface connected to a network, for example network 110. In 203, at least one hardware processor 101 optionally computes a plurality of retrieval scores, each calculated for one of the plurality of digital documents using a relevance function, denoted by s(d), scoring a relevance of one of the retrieved plurality of digital documents to the query, denoted by d, where d∈D. Optionally, at least one hardware processor 101 computes in 205 a calibrated weighted product model (WPM) estimator by calculating a combination of the plurality of retrieval scores weighted according to a plurality of retrieval features of corpus C and/or query q and/or a document d∈D, and where the plurality of retrieval features are weighted according to a relative importance, and in 209 uses the calibrated WPM estimator to score the plurality of digital documents' relevance to the query.

In some embodiments of the present invention, at least one hardware processor 101 executes the following optional method to compute the calibrated WPM estimator by calculating a combination of the plurality of retrieval scores.

Figure 4:
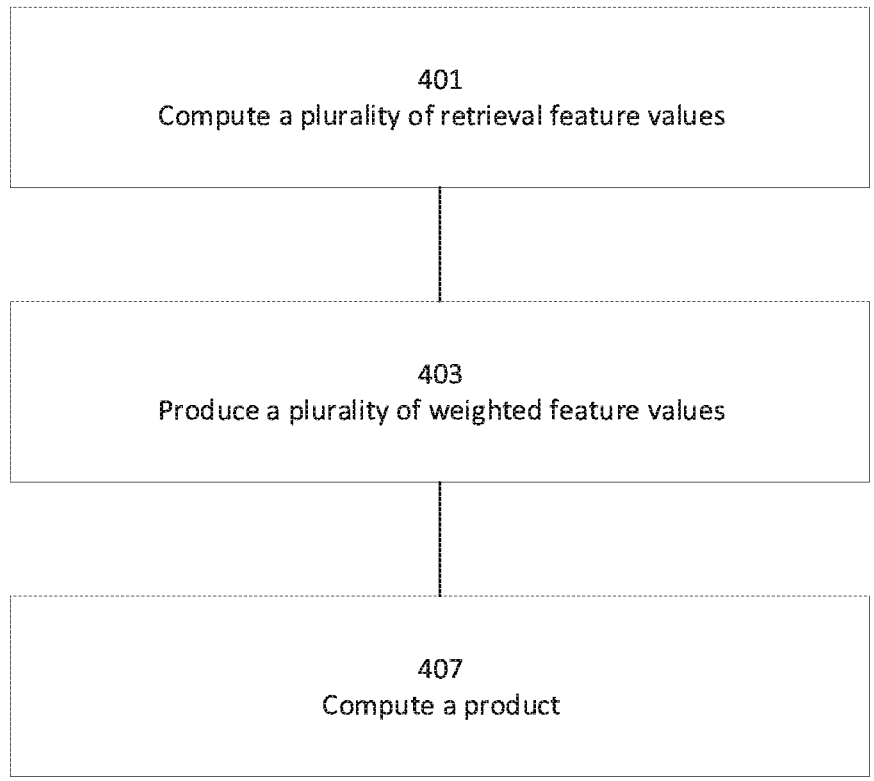
FIG. 4 is a flowchart schematically representing an optional flow of operations for computing a document score calibrator, according to some embodiments of the present invention.

Reference is now made also to FIG. 3, showing a flowchart schematically representing an optional flow of operations 300 for computing a calibrated weighted product model estimator, according to some embodiments of the present invention. In such embodiments, in 301 at least one hardware processor calibrates the plurality of retrieval scores by calibrating the retrieval score of each of the plurality of digital documents. The retrieval score of each of the plurality of digital documents is optionally calibrated by producing a document score calibrator for the document and multiplying the document's retrieval score by the document's document score calibrator. Reference is now made also to FIG. 4, showing a flowchart schematically representing an optional flow of operations 400 for computing a document's document score calibrator, according to some embodiments of the present invention.

In such embodiments, at least one hardware processor 101 computes in 401 for each document, denoted by d, a plurality of retrieval feature values by computing a retrieval feature value, denoted by $f_j(d)$ for each of the plurality of retrieval features, denoted by $f_j$ and having a weight denoted by $w_j$.

Optionally, at least a first of the plurality of retrieval features has a first certain weight value, a second of the plurality of retrieval features has a second certain weight value and the first certain weight value is different from the second certain weight value. For example, the first certain weight value may be 0.5 and the second certain weight value may be 0.75, giving the second of the plurality of retrieval features a relative importance greater than the first of the plurality of retrieval feature's importance at a ratio of 3:2.

In some embodiments of the present invention, each of the plurality of digital documents has a plurality of document terms. Examples of a document term are an identified word value in a document and an identified combination of word values in the document. Optionally, at least one of the plurality of retrieval feature values is computed using at least one of the plurality of document terms.

In some embodiments of the present invention, the query has a plurality of query terms. Examples of a query term are an identified word value in a query and an identified combination of word values in the query. Optionally, at least one of the plurality of retrieval feature values is computed using at least one of the plurality of query terms.

Optionally, at least one of the plurality of retrieval values is computed using a result of computing corpus C's score using relevance function s, denoted s(C).

Optionally, at least one of the plurality of retrieval values is computed using a document retrieval score, denoted s(d).

In 403, at least one hardware processor 101 optionally produces a plurality of weighted feature values by computing each of the document's plurality of retrieval feature values to the power of the weight of the retrieval feature value's retrieval feature, denoted by $f_j(d)^{w_j}$. Examples of some possible retrieval features and some methods for computing their retrieval feature values are described later in this document. Next, in 407, at least one hardware processor 101 optionally computes a product of the plurality of weighted feature values, to produce the document's document score calibrator.

Reference is now made again to FIG. 3. In 305, at least one hardware processor 101 optionally sums the plurality of calibrated retrieval scores produced in 301 to produce a sum score, and in 308 optionally divides the sum score by the number of digital documents in plurality of digital documents D, to produce the calibrated WPM estimator.

Reference is now made again to FIG. 4. In 401, at least one hardware processor 101 optionally computes one or more retrieval feature values of one or more of the following possible retrieval features. The following possible retrieval features refer to embodiments where each of the plurality of digital documents has a plurality of document terms, and/or the query has a plurality of query terms. Some of the following possible retrieval features are known in the art and are used in some known in the art estimators for query performance prediction, however none have been used with weights as proposed in some embodiments of the present invention.

The term invDocLen denotes a document-dependent first possible retrieval feature reflecting an amount of document terms in a document. A retrieval feature value of invDocLen is optionally computed by computing a plurality of document term occurrence counts by computing for each of the plurality of document terms an amount of occurrences of the document term in the document; computing a document's length by summing the plurality of document term occurrence counts; and computing an inverse of the document's length.

The term dLogRel denotes a document-dependent second possible retrieval feature reflecting a log-likelihood that a document is generated from a relevance model induced from the plurality of digital documents, using methods as known in the art. A retrieval feature value of dLogRel is optionally computed by computing a first probability of the document being generated from a relevance model induced from the plurality of digital documents; computing a second probability of the document being generated from a background model induced from the corpus; computing a ratio by dividing the first probability by the second probability; and computing a logarithm of the ratio.

The term invQLen denotes a document-independent third possible retrieval feature reflecting an amount of query terms in the query. A retrieval feature value of invQLen is optionally computed by computing a plurality of query term occurrence counts by computing for each of the plurality of query terms an amount of occurrences of the query term in the query; computing a query length by summing the plurality of query term occurrence counts; computing a square root of the query length; and computing an inverse of the square root of the query length.

The term invCd denotes a document-dependent forth possible retrieval feature reflecting a statistical measure measuring a document's association strength with the corpus. A retrieval feature value of invCd is optionally computed by computing the corpus' score using the relevance function; dividing the corpus' score by the document's retrieval score to produce a score ratio; and subtracting the score ratio from one.

The term invCS denotes a document-independent fifth possible retrieval feature reflecting a statistical measure measuring the corpus's similarity to the query. A retrieval feature value of invCS is optionally computed by computing the corpus' score using the relevance function; and computing an inverse of the corpus' score.

The term invSD denotes a document-dependent sixth possible retrieval feature reflecting the document's retrieval score. A retrieval feature value of invSD is optionally computed by computing a mean retrieval score of the plurality of retrieval scores; dividing the document's retrieval score by the mean retrieval score to produce a score ratio; computing a natural logarithm of the score ratio; and computing an absolute value of the computed natural logarithm.

The term dEnt denotes a document-dependent seventh possible retrieval feature reflecting a statistical measure measuring the document's content diversity according to its induced entropy. dEnt was proposed in Fiana Raiber and Oren Kurland, "*On identifying representative relevant documents*". A retrieval feature value of dEnt is optionally computed by computing a first plurality of term products by computing for each of the plurality of document terms a first term product by: computing a probability of the document term to be in the document to produce a document term probability; computing a logarithm of the document term probability; and multiplying the document term probability by the logarithm of the document term probability; and computing a first sum of the first plurality of term products.

The term dClarity denotes a document-dependent eighth possible retrieval feature reflecting a focus of a document according to a Kullback-Leibler divergence, a statistical measure measuring how one probability distribution diverges from a second. dClarity was proposed in Fiana Raiber and Oren Kurland, "On identifying representative relevant documents". A retrieval feature value of dClarity is optionally computed by computing a second plurality of term products by computing for each of the plurality of document terms a second term product by: computing a probability of the document term to be in the corpus to produce a corpus term probability; dividing the document term probability by the corpus term probability to produce a first ratio; computing a logarithm of the first ratio; and multiplying the document probability term by the logarithm of the first ratio; and computing a second sum of the second plurality of term products.

The term BM25 denotes a document-dependent ninth possible retrieval feature reflecting a likelihood of relevance given the query and a document. A retrieval feature value of BM25 is optionally computed by computing an Okapi-BM25 ranking function score of the document given the query, according to methods as known in the art.

The term dFocus denotes a document-dependent tenth possible retrieval feature reflecting an estimate of a probability that document d is the most focused document in corpus C. A retrieval feature value of dFocus is optionally computed by computing a plurality of term inverse-document-frequency (idf) values by computing for each of the plurality of documents terms a term idf value using methods as known in the art; computing a sum idf value by summing the plurality of term idf values; computing a plurality of third term products by computing for each of the plurality of document terms a third term product by: computing a normalized inverse-document-frequency (nidf) value by dividing the document term's term idf value by the sum idf value; dividing the document term probability by nifd value to produce a second ratio; computing a logarithm of the second ratio; and multiplying the document term probability by the logarithm of the second ration; computing a third sum of the third plurality of term products; multiplying the third sum by −1 to produce an exponent value; and computing the natural exponential function of the exponent value.

There exist some identified combinations of some of the suggested possible retrieval features that when a WPM estimator is computed with a plurality of retrieval features consisting of one of the identified combinations with all retrieval features weighted using equal weights, the result is a WPM estimator equivalent to one of a plurality of known in the art methods for computing an estimator for query performance prediction.

Following are some possible combinations of the suggested possible feature retrieval values, used when computing the WPM estimator.

Optionally, the plurality of retrieval features for computing the WPM estimator consists of invDocLen and dLogRel, each having a weight.

Optionally, the plurality of retrieval features for computing the WPM estimator consists of invQLen and invCd, each having a weight.

Optionally, the plurality of retrieval features for computing the WPM estimator consists of invCS and invSD, each having a weight.

Optionally, the plurality of retrieval features for computing the WPM estimator consists of invDocLen, dLogRel, invQLen, invCd, invCS and invSD each having a weight.

Optionally, the plurality of retrieval features for computing the WPM estimator consists of invDocLen, dLogRel, invQLen, invCd, invCS, invSD, dEnt, dClarity, BM25 and dFocus, each having a weight.

In some embodiments of the present invention, system 100 generates a response to the query. In such embodiments, system 100 optionally further implements the following optional method.

Figure 5:
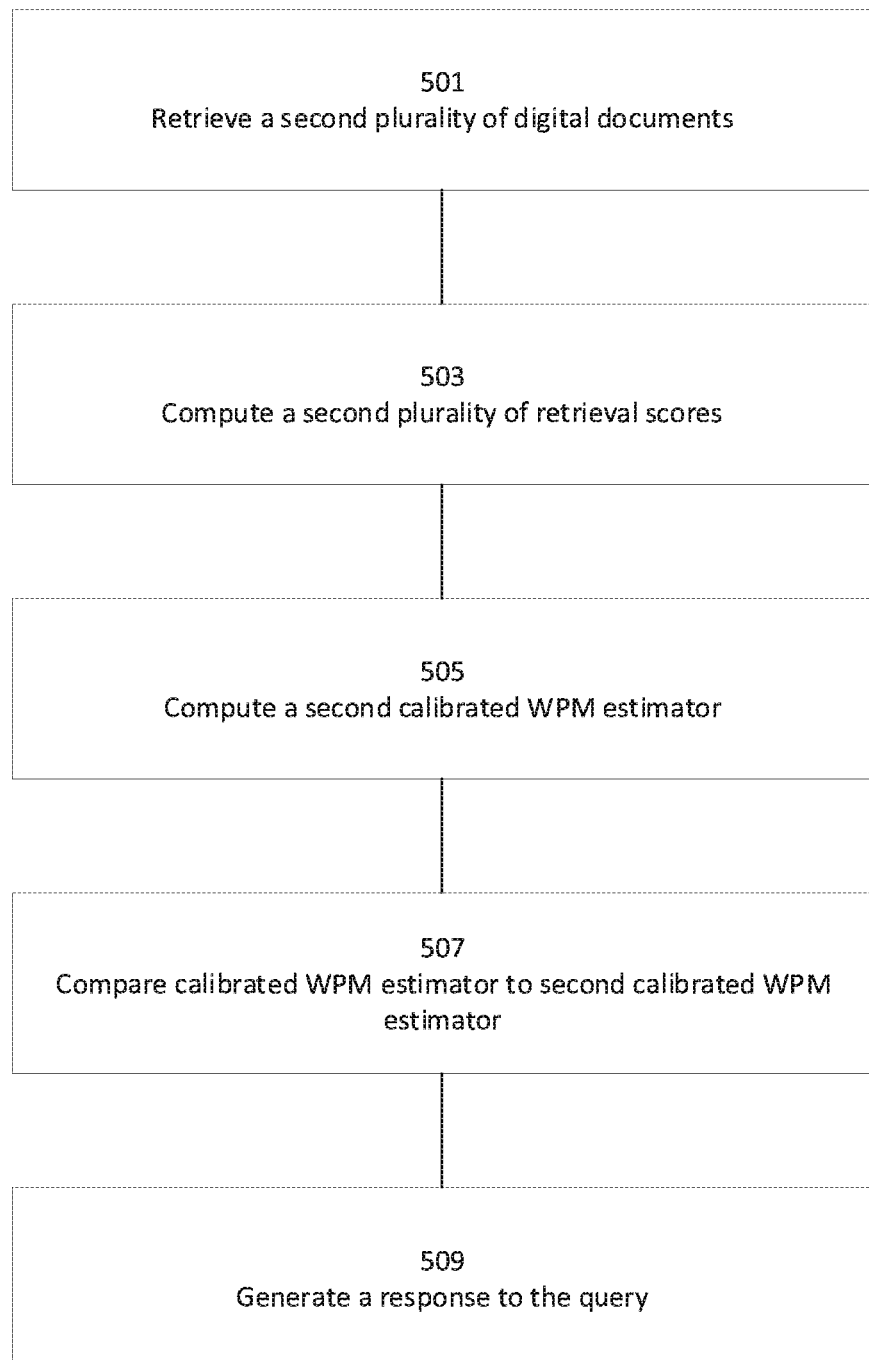
FIG. 5 is a flowchart schematically representing an optional flow of operations for generating a response to a query, according to some embodiments of the present invention.

Reference is now made also to FIG. 5, showing a flowchart schematically representing an optional flow of operations 500 for generating a response to a query, according to some embodiments of the present invention. Following, or while, computing the calibrated WPM estimator according to flow of operations 300, in 501 at least one hardware processor 101 optionally retrieves from the corpus of documents a second plurality of digital documents. Optionally, the second plurality of digital documents complies with the document retrieval query according to a second retrieval model. Optionally, the second plurality of digital documents complies with a second document retrieval query according to the retrieval model. In 503 at least one hardware processor optionally computes a second plurality of retrieval scores, each calculated for one of the second plurality of digital documents using the relevance function, and in 505 optionally computes a second calibrated WPM estimator by calculating a second combination of the second plurality of retrieval scores weighted according to the plurality of retrieval features of the corpus, and/or the query, and/or the second query, and/or a document of the second plurality of digital documents. In 507, at least one hardware processor optionally compares the calibrated WPM estimator to the second calibrated WPM estimator and according to a result of the comparison optionally selects either the plurality of digital documents of the second plurality of digital documents and generates a response to the query comprising the selected plurality of digital documents. Optionally, at least one hardware processor 101 presents the response on at least one visual display 121.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant retrieval features will be developed and the scope of the term retrieval feature is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for estimating quality of document retrieval, comprising:
    retrieving from a corpus of documents stored on at least one storage a plurality of digital documents which comply with a document retrieval query according to a retrieval model;
    computing a plurality of retrieval scores each calculated for one of the plurality of digital documents using a relevance function scoring a relevance of one of the retrieved plurality of digital documents to the query;
    computing a calibrated weighted product model (WPM) estimator by calculating a combination of the plurality of retrieval scores weighted according to a plurality of retrieval features of the corpus and/or the query and/or a document, wherein the plurality of retrieval features are weighted according to a relative importance; and
    using the calibrated WPM estimator to score the plurality of digital documents' relevance to the query;
    wherein calculating the combination of the plurality of retrieval scores weighted according to the plurality of retrieval features comprises:
    calibrating the plurality of retrieval scores, by calibrating the retrieval score of each of the plurality of digital documents by:
        producing a document score calibrator by:
            computing a plurality of retrieval feature values by computing a retrieval feature value for each of the plurality of retrieval features;
            producing a plurality of weighted feature values, by computing each of the document's plurality of retrieval feature values to the power of the weight of retrieval feature value's retrieval feature; and
            computing a product of the plurality of weighted feature values to produce the document score calibrator; and
        multiplying the document's retrieval score by the document's document score calibrator;
    summing the plurality of calibrated retrieval scores to produce a sum score; and dividing the sum score by the number of digital documents in the plurality of digital documents to produce the calibrated WPM estimator.

2. The method of claim 1, wherein each of the plurality of documents has a plurality of document terms;
wherein at least one of the plurality of retrieval feature values is computed using at least one of the plurality of document terms;
wherein a first of the plurality of retrieval features has a first certain weight value;
wherein a second of the plurality of retrieval features has a second certain weight value; and
wherein the first certain weight value is different from the second certain weight value.

3. The method of claim 1, wherein the query has a plurality of query terms;
wherein at least one of the plurality of retrieval feature values is computed using at least one of the plurality of query terms;
wherein a first of the plurality of retrieval features has a first certain weight value;
wherein a second of the plurality of retrieval features has a second certain weight value; and
wherein the first certain weight value is different from the second certain weight value.

4. The method of claim 1, wherein at least one of the plurality of retrieval feature values is computed using a result of computing the corpus' score using the relevance function;
wherein a first of the plurality of retrieval features has a first certain weight value;
wherein a second of the plurality of retrieval features has a second certain weight value; and
wherein the first certain weight value is different from the second certain weight value.

5. The method of claim 1, wherein at least one of the plurality of retrieval feature values is computed using a document retrieval score;
wherein a first of the plurality of retrieval features has a first certain weight value;
wherein a second of the plurality of retrieval features has a second certain weight value; and
wherein the first certain weight value is different from the second certain weight value.

6. The method of claim 1, wherein the document has a plurality of document terms;
wherein a first feature value of the plurality of retrieval feature values, having a first certain weight value of the first feature value's retrieval feature's weight, is computed by:
computing a plurality of document term occurrence counts by computing for each of the plurality of document terms an amount of occurrences of the document term in the document;
computing a document's length by summing the plurality of document term occurrence counts; and
computing an inverse of the document's length;
wherein a second feature value of the plurality of retrieval feature values, having a second certain weight value of the second feature value's retrieval feature's weight, is computed by:
computing a first probability of the document being generated from a relevance model induced from the plurality of digital documents using methods as known in the art;
computing a second probability of the document being generated from a background model induced from the corpus using methods as known in the art;
computing a ratio by dividing the first probability by the second probability; and
computing a logarithm of the ratio; and
wherein the first certain weight value is different from the second certain weight value.

7. The method of claim 1, wherein the query has a plurality of terms;
wherein a first feature value of the plurality of retrieval feature values, having a first certain weight value of the first feature value's retrieval feature's weight, is computed by:
computing a plurality of query term occurrence counts by computing for each of the plurality of query terms an amount of occurrences of the query term in the query;
computing a query length by summing the plurality of query term occurrence counts;
computing a square root of the query length; and
computing an inverse of the square root of the query length;
wherein a second feature value of the plurality of retrieval feature values, having a second certain weight value of the second feature value's retrieval feature's weight, is computed by:
computing the corpus' score using the relevance function;
dividing the corpus' score by the document's retrieval score to produce a score ratio; and
subtracting the score ratio from one; and
wherein the first certain weight value is different from the second certain weight value.

8. The method of claim 1, wherein a first feature value of the plurality of retrieval feature values, having a first certain weight value of the first feature value's retrieval feature's weight, is computed by:
computing the corpus' score using the relevance function; and
computing an inverse of the corpus' score;
wherein a second feature value of the plurality of retrieval feature values, having a second certain weight value of the second feature value's retrieval feature's weight, is computed by:
computing a mean retrieval score of the plurality of retrieval scores;
dividing the document's retrieval score by the mean retrieval score to produce a score ratio;
computing a natural logarithm of the score ratio; and
computing an absolute value of the computed natural logarithm; and
wherein the first certain weight value is different from the second certain weight value.

9. The method of claim 1, wherein the document has a plurality of document terms;
wherein the query has a plurality of query terms;
wherein a first feature value of the plurality of retrieval feature values is computed by:
computing a plurality of document term occurrence counts by computing for each of the plurality of document terms an amount of occurrences of the document term in the document;
computing a document's length by summing the plurality of document term occurrence counts; and
computing an inverse of the document's length;

wherein a second feature value of the plurality of retrieval feature values is computed by:
  computing a first probability of the document being generated from a relevance model induced from the plurality of digital documents;
  computing a second probability of the document being generated from a background model induced from the corpus;
  computing a ratio by dividing the first probability by the second probability; and
  computing a logarithm of the ratio;
wherein a third retrieval value of the plurality of retrieval feature values is computed by:
  computing a plurality of query term occurrence counts by computing for each of the plurality of query terms an amount of occurrences of the query term in the query;
  computing a query length by summing the plurality of query term occurrence counts;
  computing a square root of the query length; and
  computing an inverse of the square root of the query length;
wherein a fourth retrieval value of the plurality of retrieval feature values is computed by:
  computing the corpus' score using the relevance function;
  dividing the corpus' score by the document's retrieval score to produce a score ratio; and
  subtracting the score ratio from one;
wherein a fifth retrieval value of the plurality of retrieval feature values is computed by:
  computing the corpus' score using the relevance function; and
  computing an inverse of the corpus' score; and
wherein a sixth retrieval value of the plurality of retrieval feature values is computed by:
  computing a mean retrieval score of the plurality of retrieval scores;
  dividing the document's retrieval score by the mean retrieval score to produce a score ratio;
  computing a natural logarithm of the score ratio; and
  computing an absolute value of the computed natural logarithm.

10. The method of claim 9, wherein a seventh feature value of the plurality of retrieval feature values is computed by:
  computing a first plurality of term products by computing for each of the plurality of document terms a first term product by:
    computing a probability of the document term to be in the document to produce a document term probability;
    computing a logarithm of the document term probability; and
    multiplying the document term probability by the logarithm of the document term probability; and
  computing a first sum of the first plurality of term products;
wherein an eighth feature value of the plurality of retrieval feature values is computed by:
  computing a second plurality of term products by computing for each of the plurality of document terms a second term product by:
    computing a probability of the document term to be in the corpus to produce a corpus term probability;
    dividing the document term probability by the corpus term probability to produce a first ratio;
    computing a logarithm of the first ratio; and
    multiplying the document probability term by the logarithm of the first ratio; and
  computing a second sum of the second plurality of term products;
wherein a ninth retrieval value of the plurality of retrieval feature values is computed by computing an Okapi-BM25 score of the document given the query, according to methods as known in the art; and
wherein a tenth retrieval value of the plurality of retrieval feature values is computed by:
  computing a plurality of term inverse-document-frequency (idf) values by computing for each of the plurality of documents terms a term idf value using methods as known in the art;
  computing a sum idf value by summing the plurality of term idf values;
  computing a plurality of third term products by computing for each of the plurality of document terms a third term product by:
    computing a normalized inverse-document-frequency (nidf) value by dividing the document term's term idf value by the sum idf value;
    dividing the document term probability by nifd value to produce a second ratio;
    computing a logarithm of the second ratio; and
    multiplying the document term probability by the logarithm of the second ration;
  computing a third sum of the third plurality of term products;
  multiplying the third sum by −1 to produce an exponent value; and
  computing the natural exponential function of the exponent value.

11. The method of claim 1, further comprising:
using the calibrated WPM estimator to generate a response to the query.

12. The method of claim 11, wherein the calibrated WPM estimator is used to generate a response to the query by:
  retrieving from the corpus of documents a second plurality of digital documents which comply with the document retrieval query according to a second retrieval model;
  computing a second plurality of retrieval scores each calculated for one of the second plurality of digital documents using the relevance function;
  computing a second calibrated weighted product model (WPM) estimator by calculating a second combination of the second plurality of retrieval scores weighted according to the plurality of retrieval features of the corpus and/or the query and/or a document;
  comparing the calibrated WPM estimator to the second calibrated WPM estimator; and
  generating a response to the query comprising either the plurality of digital documents or the second plurality of digital documents, selected according to a result of the comparison.

13. The method of claim 11, wherein the calibrated WPM estimator is used to generate a response to the query by:
  retrieving from the corpus of documents a second plurality of digital documents which comply with a second document retrieval query according to the retrieval model;
  computing a second plurality of retrieval scores each calculated for one of the second plurality of digital documents using the relevance function;

computing a second calibrated weighted product model (WPM) estimator by calculating a second combination of the second plurality of retrieval scores weighted according to the plurality of retrieval features of the corpus and/or the second query and/or a document;

comparing the calibrated WPM estimator to the second calibrated WPM estimator; and generating a response to the query comprising either the plurality of digital documents or the second plurality of digital documents, selected according to a result of the comparison.

14. A system for estimating quality of document retrieval, comprising:

at least one storage; and at least one hardware processor, adapted to:

retrieve from a corpus of documents stored on the at least one storage a plurality of digital documents which comply with the document retrieval query according to a retrieval model;

compute a plurality of retrieval scores each calculated for one of the retrieved plurality of digital documents using a relevance function scoring a relevance of one of the plurality of digital documents to the query;

compute a calibrated weighted product model (WPM) estimator by calculating a combination of the plurality of retrieval scores weighted according to a plurality of retrieval features of the corpus and/or the query and/or a document, wherein the plurality of retrieval features are weighted according to a relative importance; and use the calibrated WPM estimator to score the plurality of digital documents' relevance to the query;

wherein calculating the combination of the plurality of retrieval scores weighted according to the plurality of retrieval features comprises;

calibrating the plurality of retrieval scores, by calibrating the retrieval score of each of the plurality of digital documents by:

producing a document score calibrator by:

computing a plurality of retrieval features values by computing a retrieval feature value for each of the plurality of retrieval features;

producing a plurality of weighted feature values, by computing each of the document's plurality of retrieval features values to the power of the weight of retrieval feature value's retrieval feature; and computing a product of the plurality of weighted feature values to produce the document score calibrator; and multiplying the document's retrieval score by the document's document score calibrator;

summing the plurality of calibrated retrieval scores to produce a sum score;

dividing the sum score by the number of digital documents in the plurality of digital documents to produce the calibrated WPM estimator.

\* \* \* \* \*